Dec. 21, 1937. W. Y. BROWN 2,102,674
WHEEL TRUCK
Filed April 13, 1937 2 Sheets-Sheet 1
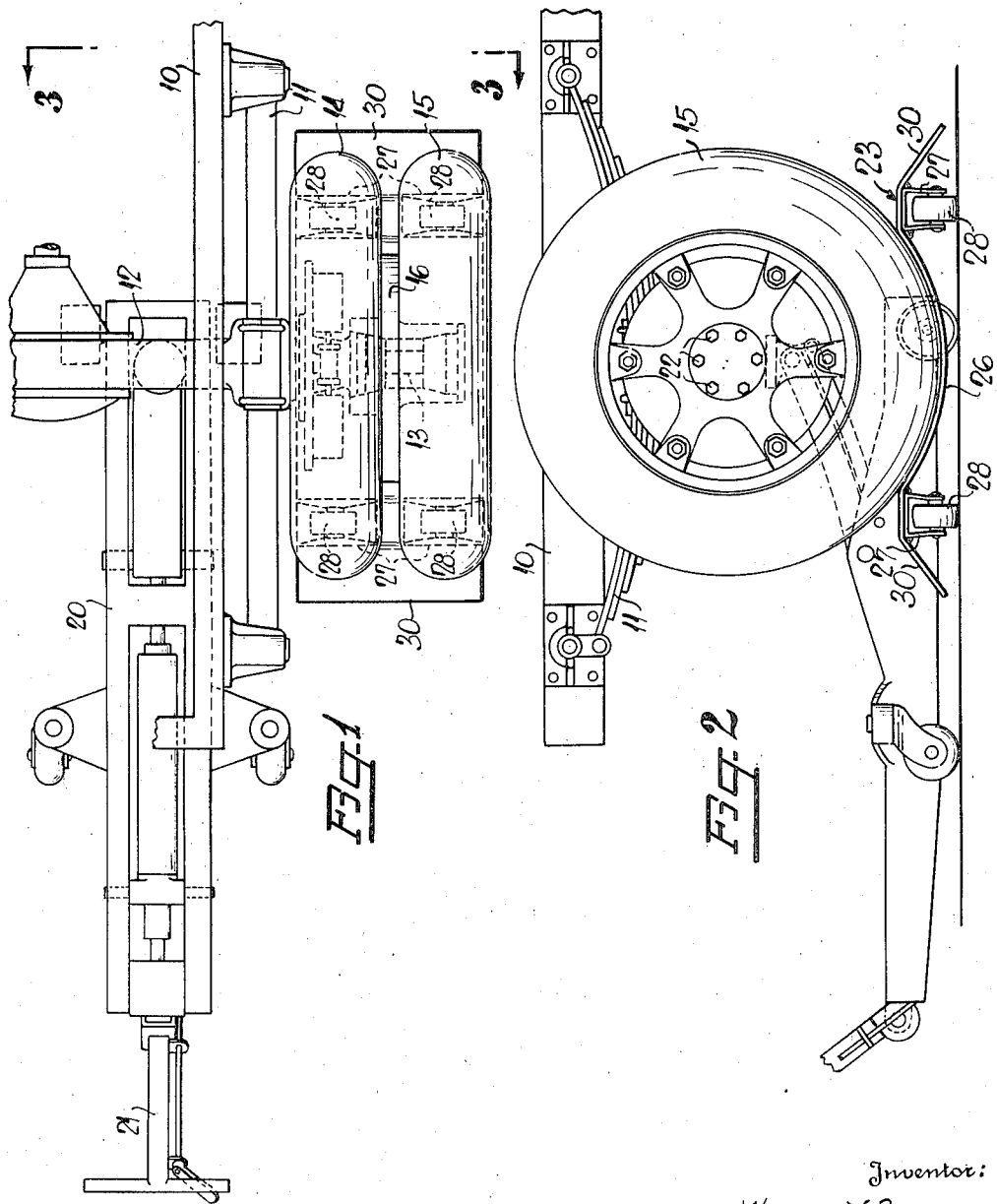
Inventor:
WILLIAM Y. BROWN
By
Attorney

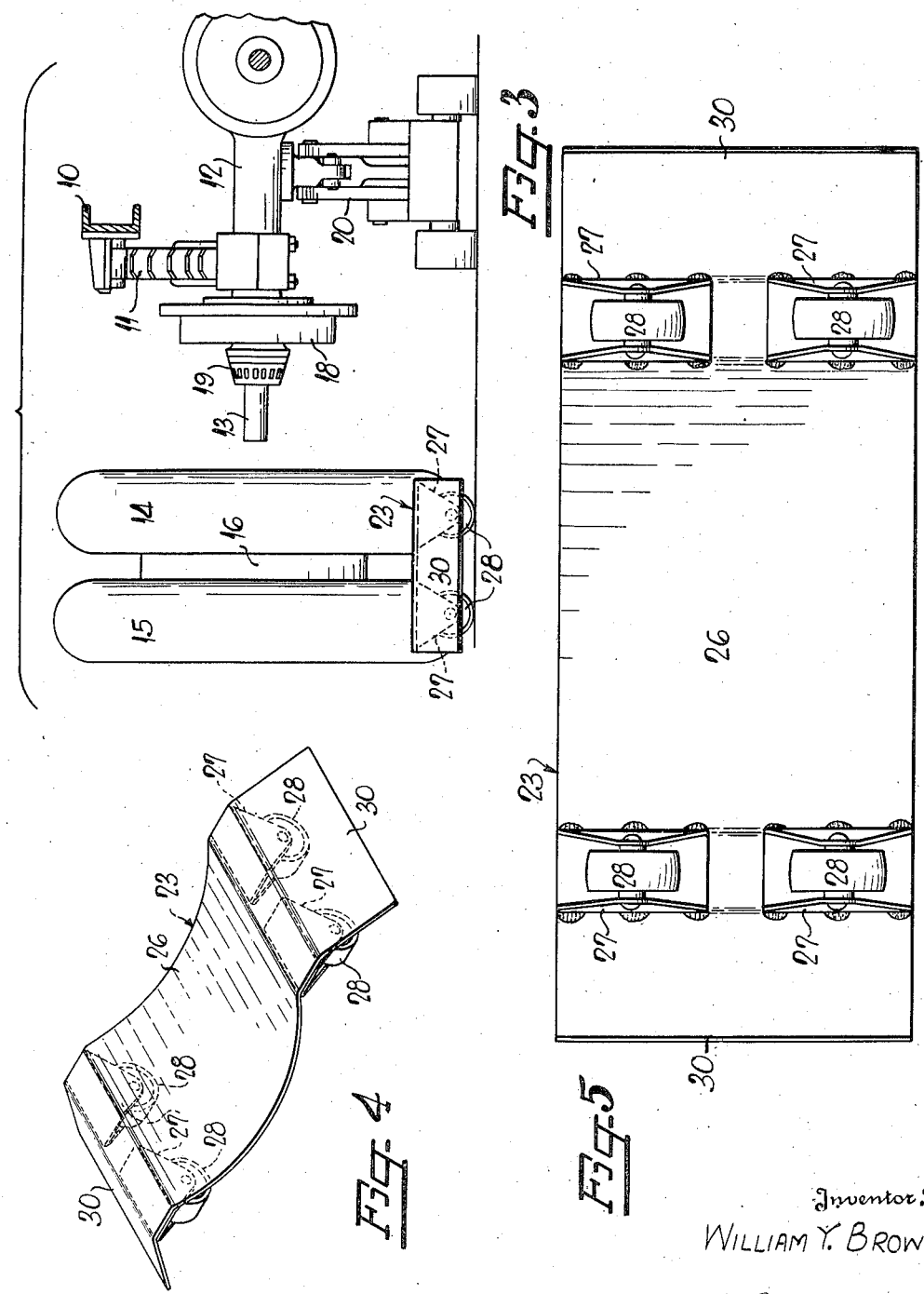

Patented Dec. 21, 1937

2,102,674

UNITED STATES PATENT OFFICE 2,102,674

WHEEL TRUCK

William Y. Brown, Charlotte, N. C., assignor of one-third to William C. Honeycutt, Black Mountain, N. C., and one-third to Robert H. Garland, Charlotte, N. C.

Application April 13, 1937, Serial No. 136,643

1 Claim. (Cl. 280—61)

This invention relates to a wheel support which is especially adapted for use in removing heavy wheels from automotive vehicles. It is often necessary to remove these wheels for various purposes such as for relining the brakes, changing tires, or performing other operations in the proximity of the wheels. By removing the wheels, not only can the wheels be more effectively repaired in many instances, but also the parts of the automobile beyond the wheels may be repaired without having the wheels obstructing the free movement of the mechanic. Since these wheels very often weigh from three to nine hundred pounds, it is evident that some transporting means must be provided to carry this great weight.

Since it is desirable to hold the center of the wheel, when removed, in direct alinement with the axle from which it is removed so that it can be replaced, previous methods employed are defective.

It is therefore, an object of this invention to provide a wheel support having rollers disposed therebeneath so that when a tire or wheel placed thereon for purposes of being removed from the axle the support will be capable of moving only in a direction parallel to the longitudinal axis of the axle. By providing this type of apparatus it is evident, that not only the friction will be lessened, but also the center of the wheel will always be in alinement with the center of the axle from which it was removed. When it is desired to replace the wheel it is only necessary to push the wheel together with the truck toward the axle and the hole in the wheel will automatically coincide with the shaft to thereby replace the wheel in its original position.

Some of the objects of the invention having been stated, other objects will appear as the description proceeds when taken in connection with the accompanying drawings, in which:—

Figure 1 is a top plan view of the rear right-hand wheel of a truck showing the invention associated therewith;

Figure 2 is a side elevation of Figure 1;

Figure 3 is an elevation with parts shown in section and taken along line 3—3 in Figure 1, showing the wheel removed from the axle;

Figure 4 is an isometric view of the wheel support;

Figure 5 is a bottom plan view of the wheel support.

Referring more specifically to the drawings, the numeral 10 denotes the framework or chassis of a truck which is supported by any suitable means such as springs 11, the lower central portion of said springs being secured to rear axle housing 12. This housing has a conventional axle shaft 13 therein upon which is adapted to be mounted wheels 14 and 15, said wheels being united by a suitable hub 16. The unit comprising members 14, 15 and 16 on large trucks which very often weigh nearly 1,000 pounds and it is very difficult, at times, to remove it from or replace it on the axle 13. As previously stated, it is frequently necessary to move the wheel to the position shown in Figure 3 in order that the parts such as brake bands 18 may be replaced or so that the bearings 19 removed from the axle. In fact, it is necessary to remove the wheels to perform any other operation where the wheels or fenders would prevent free access to the same.

When the removal is desired to be effected, a suitable hydraulic jack 20 is placed beneath the axle housing 12 in the manner shown in Figures 1, 2 and 3. The handle 21 is then manipulated so that the rear wheels will be disposed a few inches above the floor line and the wheel support is placed therebeneath, after which the necessary bolts such as 22 are removed so that the combined wheel unit comprising members 14, 15 and 16 may be removed longitudinally from shaft 13. After the bolts 22 are removed the rear axle 13 is lowered to a position where only the weight of the wheels will be exerted upon the wheel support 23. Then it is only necessary to exert enough pressure upon the wheel support 23 to withdraw the wheel unit from the axle plus the friction offered by the floor to the rollers on the support since the wheel does not carry any of the axle load.

This wheel support comprises a top plate which has an arcuate central portion 26 into which the lower peripheries of the wheel 14 and 15 are adapted to rest. Rigidly secured to the lower side of the plate are a plurality of brackets 27 in which are rotatably mounted wheels 28.

It will be noted that since these wheels are fixed, the wheel support 23 will only be allowed to move in a straight line, therefore, when this support is placed beneath the wheels as shown in Figure 1, and withdrawn to a position as shown in Figure 3, the center of the wheels 14 and 15 will travel in direct alinement with the center of shaft 13 although the wheel is disconnected from the shaft. When it is desired to replace the wheel, it is only necessary to move the support 23 in the reverse direction and the parts will again assume their initial position. The plate 25 has down-turned portions 30 on opposed sides thereof which form suitable guards for the opposed edges of the plate and also tend to hide from view the rollers 28 and the brackets 27.

In the drawings and specification there has been set forth a preferred embodiment of the invention and although specific terms are employed, they are used in a generic and descriptive sense only, and not for purposes of limitation, the scope of the invention being set forth in the appended claim.

I claim:

A wheel truck for removing and installing heavy wheels on automotive trucks and the like, comprising a sheet of metal having its central portion curved throughout its breadth to fit the periphery of a truck wheel, a horizontally disposed portion at each end of said curved portion, a downwardly bent portion at each end of the sheet, two wheel mountings secured to the lower side of each of the horizontal portions of said sheet, a wheel rotatably disposed in each mounting on an axis disposed at right angles to the axis of the truck wheel so that the wheel truck can be rolled under a raised truck wheel from the side of the wheel, and whereby the truck wheel can be removed from its axle laterally and in alignment with a projection of the axle, and due to the fixed axis of the wheels on the wheel truck, the bearings of the truck wheel will at all times be held in alignment with its axle thus insuring easy replacement of the truck wheel on its axle.

WILLIAM Y. BROWN.